United States Patent
Jeong et al.

(10) Patent No.: US 9,243,899 B2
(45) Date of Patent: Jan. 26, 2016

(54) METHOD OF MEASURING A HEIGHT OF 3-DIMENSIONAL SHAPE MEASUREMENT APPARATUS

(71) Applicant: KOH YOUNG TECHNOLOGY INC., Seoul (KR)

(72) Inventors: Joong Ki Jeong, Seoul (KR); Deok-Hwa Hong, Gwangmyeong-si (KR)

(73) Assignee: KOH YOUNG TECHNOLOGY INC., Seoul (KR)

( * ) Notice: Subject to any disclaimer, the term of this patent is extended or adjusted under 35 U.S.C. 154(b) by 0 days.

(21) Appl. No.: 14/397,520

(22) PCT Filed: May 22, 2013

(86) PCT No.: PCT/KR2013/004482
§ 371 (c)(1),
(2) Date: Oct. 28, 2014

(87) PCT Pub. No.: WO2013/176482
PCT Pub. Date: Nov. 28, 2013

(65) Prior Publication Data
US 2015/0124081 A1    May 7, 2015

(30) Foreign Application Priority Data

May 22, 2012   (KR) .................. 10-2012-0054479
May 22, 2013   (KR) .................. 10-2013-0057647

(51) Int. Cl.
*H04N 7/18* (2006.01)
*G01B 11/14* (2006.01)
*G01B 11/06* (2006.01)
*G01B 11/25* (2006.01)

(52) U.S. Cl.
CPC ............ *G01B 11/14* (2013.01); *G01B 11/0608* (2013.01); *G01B 11/2513* (2013.01); *G01B 11/2531* (2013.01); *G01B 2210/56* (2013.01)

(58) Field of Classification Search
None
See application file for complete search history.

(56) References Cited

U.S. PATENT DOCUMENTS

| | | | |
|---|---|---|---|
| 2010/0091302 A1* | 4/2010 | Kim | G01B 11/2531 356/603 |
| 2010/0295941 A1 | 11/2010 | Jeong et al. | |
| 2014/0009601 A1* | 1/2014 | Cho et al. | 348/126 |

FOREIGN PATENT DOCUMENTS

| | | |
|---|---|---|
| CN | 101726261 | 6/2010 |
| JP | 10-12683 | 1/1998 |
| JP | 2004-309240 | 11/2004 |
| JP | 2004-326264 | 11/2004 |
| JP | 2004-361142 | 12/2004 |
| JP | 2009-92485 | 4/2009 |
| JP | 2009-260103 | 11/2009 |
| JP | 2010-54273 | 3/2010 |
| JP | 2010-91570 | 4/2010 |
| JP | 2010-243508 | 10/2010 |
| JP | 2011-13110 | 1/2011 |
| JP | 2011-13219 | 1/2011 |
| KR | 10-2007-0047235 | 5/2007 |
| KR | 10-2010-0041022 | 4/2010 |
| KR | 10-2011-0060041 | 6/2011 |
| KR | 10-2011-0089506 | 8/2011 |
| KR | 10-2011-0115752 | 10/2011 |
| KR | 10-1133968 | 4/2012 |
| WO | 2007/099008 | 9/2007 |

OTHER PUBLICATIONS

Written Opinion of the International Searching Authority for International Application No. PCT/KR2013/004482, dated Sep. 24, 2013.
International Search Report for International Application No. PCT/KR2013/004482, dated Sep. 24, 2013.

* cited by examiner

*Primary Examiner* — Sath V Perungavoor
*Assistant Examiner* — Dakshesh Parikh (74) *Attorney, Agent, or Firm* — Kile Park Reed & Houtteman PLLC (57) ABSTRACT

A method of measuring a height of 3-dimensional shape measurement apparatus includes irradiating a first grid pattern light from a plurality of first lighting devices and a second grid pattern light from a plurality of second lighting devices which are alternatively arranged to the first lighting devices toward a target object wherein the first grid pattern light has a first equivalent wavelength and the second grid pattern light has a second equivalent wavelength that is different from the first equivalent wavelength, and obtaining a first pattern image corresponding to the first grid pattern light and a second pattern image corresponding to the second grid pattern light, generating combined pattern images by combining the first and second pattern images obtained from the first and second lighting devices adjacent to each other among the plurality of first and second lighting devices, calculating heights of the target object according to a combined equivalent wavelength of the combined pattern images, and determining a representative height of the target object by using the calculated heights of the target object. And therefore, it is possible to measure a height of a target object which exceeds an available height of measurement by each of the first and second lighting devices, as well as, more accurate and reliable height may be obtained.

12 Claims, 3 Drawing Sheets

METHOD OF MEASURING A HEIGHT OF 3-DIMENSIONAL SHAPE MEASUREMENT APPARATUS

TECHNICAL FIELD

Exemplary embodiments of the present invention relate to a 3-dimensional shape measurement apparatus. More particularly, exemplary embodiments of the present invention relate to a 3-dimensional shape measurement apparatus which irradiates grid pattern light toward a target object to measure 3-dimensional shape.

BACKGROUND ART

In general, at least one printed circuit board is equipped in an electronic device and elements with various shapes are mounted on these printed circuit boards. And 3-dimensional shape measurement apparatus is used to inspect defect of such elements.

Conventional 3-dimensional shape measurement apparatus uses a camera to capture a reflection image of a grid pattern light which is emitted from the lighting device, and is measures 3-dimensional shape of the target object such as printed circuit board by using the captured reflection image.

In such 3-dimensional shape measurement apparatus described above, an equivalent wavelength corresponding to a pitch interval of a grid pattern light emitted from the lighting device is proportional to an available height of measurement of a target object, therefore, it is not possible to unlimitedly increase the equivalent wavelength but increase within a predetermined range.

Therefore, it is impossible to measure a 3-dimensional shape of a target object when a height of a target object exceeds an available height which can be measured by a grid pattern light emitted from a lighting device.

DISCLOSURE

Technical Problem

Therefore, the technical problem of the present invention is to provide a 3-dimensional shape measurement apparatus capable of increasing an available height of measurement of a target object.

Technical Solution

In one embodiment of the present invention, a method of measuring a height of 3-dimensional shape measurement apparatus includes irradiating a first grid pattern light from a plurality of first lighting devices and a second grid pattern light from a plurality of second lighting devices, which are alternatively arranged to the first lighting devices, toward a target object wherein the first grid pattern light has a first equivalent wavelength and the second grid pattern light has a second equivalent wavelength that is different from the first equivalent wavelength, and obtaining a first pattern image corresponding to the first grid pattern light and a second pattern image corresponding to the second grid pattern light, generating combined pattern images by combining the first and second pattern images obtained from the first and second lighting devices adjacent to each other among the plurality of first and second lighting devices, calculating heights of the target object according to a combined equivalent wavelength of the combined pattern images, and determining a representative height of the target object by using the calculated heights of the target object.

In one embodiment, when generating the combined pattern images, each of the first and second pattern images is used to be combined with a pattern image of the lighting devices which are adjacent at any one side.

In one embodiment, when generating the combined pattern images, each of the first and second pattern images is used to be combined with a pattern image of the lighting devices which are adjacent at both sides.

In one embodiment, generating the combined images may include generating first combined pattern images by first combining first and second pattern images formed by first and second lighting devices which are adjacent to each other among the first and second plurality of lighting devices, and generating second combined pattern images by second combining first and second combined pattern images, and calculating heights of the target object according to the combined equivalent wavelength of the combined pattern images comprises calculating heights of the target object according to a combined equivalent wavelength of the second combined pattern images.

In one embodiment, the method of measuring a height of 3-dimensional shape measurement apparatus may further include determining a primary noise among the first and second pattern images, and excluding the determined primary noise from the combination before generating the combined pattern images.

In one embodiment, the primary noise is determined when a signal deviates a tolerance based on at least one of brightness, signal to noise ratio and phase-smearing of the first and second pattern images is generated. The primary noise may be determined for each pixel of the first and second pattern images, and excluding the determined primary noise comprises at least one of excluding a pixel which is determined as a noise among pixels of the first and second pattern images from the combination, and excluding a pattern image which includes a pixel determined as a noise among pixels of the first and second pattern images from the combination.

In one embodiment, after excluding the determined noise from the combination, the pattern image adjacent at both sides of the pattern image, which is determined as the noise, may be combined with the pattern image which is not adjacent to each other and has different equivalent wavelength.

In one embodiment, the method of measuring a height of 3-dimensional shape measurement apparatus may further include determining a secondary noise among the calculated heights, and excluding the determined noise from the representative height determination after calculating heights of the target object according to the combined equivalent wavelength of the combined pattern images. A height value which deviates from a tolerance among the calculated heights of the target object is determined as the secondary noise. The secondary noise may be determined for each pixel of the first and second pattern images, and excluding the determined noise from the representative height selection may include excluding a height corresponding to the determined noise pixel among the heights of the target object from the representative height determination.

In one embodiment, determining the representative height of the target object by using the calculated heights of the target object may include determining a median value as the representative height when the calculated heights of the target object is arranged in an order of size.

In another embodiment of the present invention, a method of measuring a height of 3-dimensional shape measurement apparatus includes capturing pattern images formed by irradiating grid pattern lights, which has identical equivalent wavelength from at least two lighting devices or at least one or more equivalent wavelength different from each other, toward a target object, calculating heights of the target object from the pattern images, and determining a representative height by selecting a height of one pattern image height among the calculated heights of the target object.

In one embodiment, determining the representative height may include determining a median value as the representative height among the calculated heights of the target object.

In one embodiment, the method of measuring a height of 3-dimensional shape measurement apparatus may further include determining a primary noise among the captured images, and excluding the determined noise before calculating each height of the target object. A signal which deviates from a tolerance based on at least one of brightness, signal to noise ratio, and phase-smearing of the first and second pattern images may be determined as the primary noise.

In one embodiment determining the representative height may include determining a secondary noise among the calculated heights of the target object, and determining the representative height after excluding the determined noise. A height value which deviates from a tolerance among the calculated heights of the target object may be determined as the secondary noise.

In another embodiment of the present invention, a method of measuring a height of 3-dimensional shape measurement apparatus includes capturing pattern images formed by irradiating grid pattern lights, which has identical equivalent wavelength from at least two lighting devices or at least one or more equivalent wavelength different from each other, toward a target object, calculating heights of the target object from the pattern images, and determining a representative height by averaging among the calculated heights of the target object.

In one embodiment, before selecting the representative height, a signal which deviates from a tolerance based on at least one of brightness of the first and second pattern images before calculating heights of the target object from the pattern images is determined as a primary noise, and a height value which deviates from a tolerance among the calculated heights of the target object is determined as a secondary noise, and the primary and secondary noises may be excluded from the determination.

Advantageous Effects

Thus, a method of measuring a height of 3-dimensional shape measurement apparatus according to an embodiment of the present invention irradiates grid pattern lights emitted from plurality of first and second lighting devices which have equivalent wavelengths different from each other and alternatively arranged, generates combined pattern images by combining first and second pattern images which are obtained from the first and second lighting devices which are adjacent to each other, calculates heights of the target object according to a combined equivalent wavelength of the combines images, and determines a representative height of a target object by using the calculated heights of the target object, and therefore, it is possible to measure a height of a target object which exceeds an available height of measurement by each of the first and second lighting devices, as well as, more accurate and reliable height may be obtained.

In addition, it is possible to reduce the measurement time since calculation efficiency is improved by combing only first and second pattern images which are formed by first and second lighting devices adjacent to each other.

Also, an available height of measurement is greatly increased since a combined equivalent wavelength is increased when pattern images are first combined by adjacent lighting devices and the combined images are second combined.

Also, it is possible to improve an accuracy and reliability of final height measurement since noise data or height data corresponding to a noise measured from a target object is excluded before combining pattern images.

Also, it is possible to improve a reliability of final height measurement since a representative height is determined from actually measured data when the representative height is determined from a height of one pattern image among heights calculated from the target object, and the final height measurement may be more reliable if a median value is determined as the representative height of a target object since noise is not effectual.

MODE FOR INVENTION

The present invention is described more fully hereinafter with reference to the accompanying drawings, in which example embodiments of the present invention are shown. The present invention may, however, be embodied in many different forms and should not be construed as limited to the example embodiments set forth herein. Rather, these example embodiments are provided so that this disclosure will be thorough and complete, and will fully convey the scope of the present invention to those skilled in the art. In the drawings, the sizes and relative sizes of layers and regions may be exaggerated for clarity.

It will be understood that, although the terms first, second, third etc. may be used herein to describe various elements, components, regions, layers and/or sections, these elements, components, and/or sections should not be limited by these terms. These terms are only used to distinguish one element, component, region, layer or section from another region, layer or section. Thus, a first element, component, or section discussed below could be termed a second element, component, or section without departing from the teachings of the present invention.

The terminology used herein is for the purpose of describing particular example embodiments only and is not intended to be limiting of the present invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, with reference to the drawings, preferred embodiments of the present invention will be described in detail.

Figure 1:
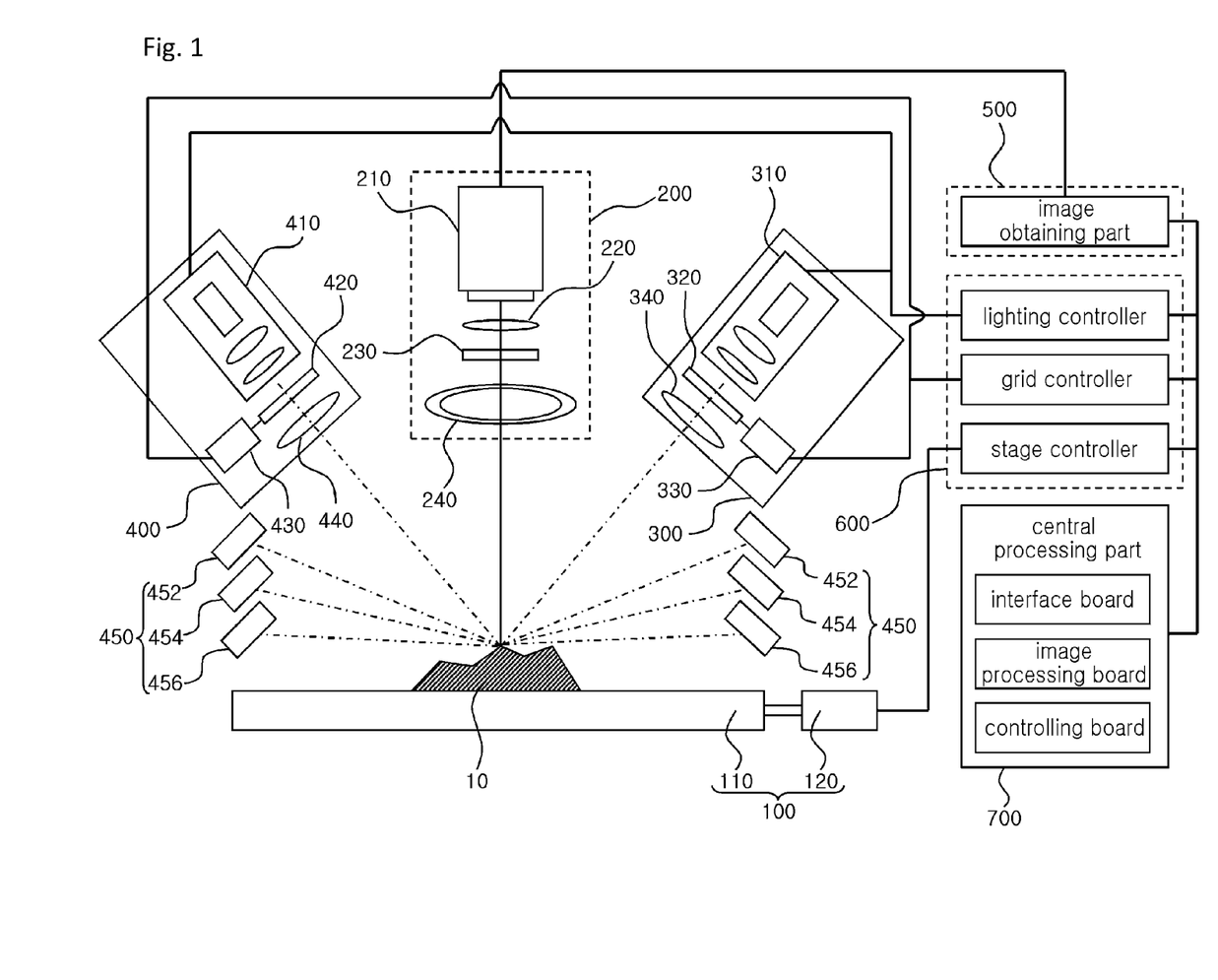
FIG. 1 is a conceptual diagram explaining a method of measuring a height of 3-dimensional shape measurement system according to an embodiment of the present invention.
Figure 2:
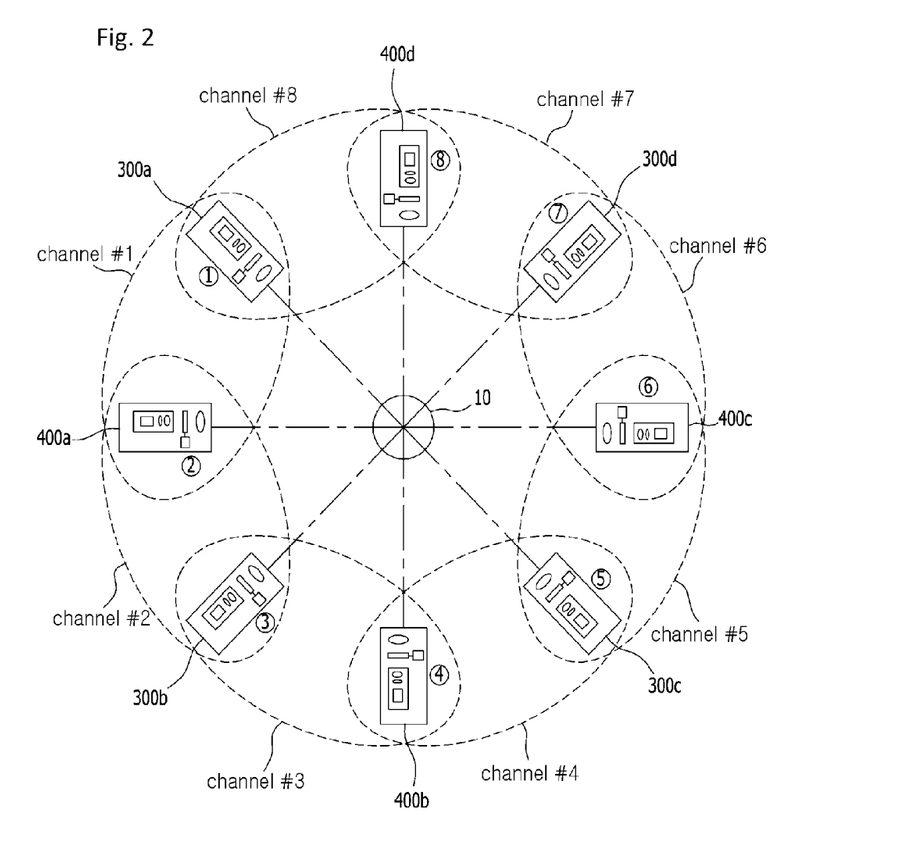
FIG. 2 is conceptual plain view explaining a method of measuring a height of 3-dimensional shape measurement system according to an embodiment of the present invention.

FIG. 1 is a conceptual diagram explaining a method of measuring a height of 3-dimensional shape measurement system according to an embodiment of the present invention, and FIG. 2 is conceptual plain view explaining a method of measuring a height of 3-dimensional shape measurement system according to an embodiment of the present invention.

Referring to FIGS. 1 and 2, a 3-dimensional shape measurement apparatus measures 3-dimensional shape based on a height of a target object by using pattern images of a grid pattern light. In one embodiment, the 3-dimensional shape measurement apparatus may include a measurement stage part 100, an image capturing part 200, first and second lighting devices 300 and 400 which includes a first lighting part 350 and a second lighting part 450 respectively, an image obtaining part 500, a module controlling part 600, and a central processing part 700.

The measurement stage part 100 may include a stage 110 which supports a target object 10 and a stage transfer unit 120 which transfers the stage 110. In the embodiment, measurement position of the target object 100 may be changed since the target object 10 is moved by the stage 110 according to the image capturing part 200 and first and second light devices 300 and 400

The image capturing part 200 is arranged above the stage 110 to capture an image of a target object 10 by receiving a light reflected by the target object 10. In other words, the image capturing part 200 receives the light which is emitted from the first and second lighting devices 300 and 400 and reflected by the target object 10 and captures the image of the target object.

The image capturing part 200 may include a camera 210, an image forming lens 220, a filter 230, and a circular lamp 240. The camera 210 receives the light which is reflected by the target object 10 and captures a plane image of the target object 10, in one embodiment, the camera may be a CCD camera or CMOS camera. The image forming lens 220 is arranged at the bottom of the camera 210, receives the light reflected by the target object 10, and forms an image on the camera 210. The filter 230 is arranged at the bottom of the image forming lens 220 to filter the reflected light and provide to the image forming lens 220, in one embodiment, the filter may be one of a frequency filter, a color filter, and a light intensity adjustment filter. The circular lamp 240 is arranged at the bottom of the filter 230 and provides light to capture unusual image such as 2-dimensional image of the target object 10.

The first lighting device generates first and second grid pattern lights having predetermined equivalent wavelength and includes plurality of lighting devices to irradiate grid pattern lights toward the target object 10. For example, the first lighting part may include plurality of first lighting devices 300 and plurality of second lighting devices 400 as shown in FIG. 2.

In one embodiment, the plurality of first lighting devices 300 may be arranged at an equal distance with the target object 10 as the center, and at the same time, inclined toward the stage 10 which supports the target object 10. As shown in FIG. 2, four first lighting devices 300a 300b 300c and 300d may be arranged at an equal distance with the target object 10 as the center and inclined toward the stage 110 which supports the target object 10. In FIG. 2, four first lighting devices 300 are arranged at an equal distance with the target object 10 as the center, but more than four or less than four lighting devices 300 may be installed. The first lighting devices 300 as described above irradiate grid pattern lights having a first equivalent wavelength toward the target object 10.

The first lighting devices 300 may include a first lighting unit 310, a first grid unit 320, a first grid transfer unit 330 and a first condensing lens 340. The first lighting unit 310 includes a lighting source and at least one lens to generate a light, the first transfer unit 310 is arranged at the bottom of the first lighting unit 310 to convert the light emitted from the first lighting unit 310 to a first grid pattern light having grid pattern. The first grid transfer unit 330 is connected to the first grid unit 320 to transfer the first grid unit 320, in one embodiment, a piezoelectric transfer unit or a fine linear transfer unit may be used as the first grid transfer unit 330. The first condensing lens 340 is arranged at the bottom of the first grid unit 320 to condense the first grid light which has passed the first grid unit 320 to the target object 10.

In one embodiment, the plurality of second lighting devices 400 may be arranged between the first lighting devices 300 which are adjacent to each other, and at the same time, and inclined toward the stage 10 which supports the target object 10. As shown in FIG. 2, the four second lighting devices 400a 400b 400c and 400d may be arranged at an equal distance with the target object 10 as the center and inclined to the stage 110 which supports the target object 10. In FIG. 2, four second lighting devices 400 are arranged at an equal distance with the target object 10 as the center, but more than four or less than four lighting devices 400 may be installed. The second lighting devices 400 as described above irradiate grid pattern lights having a second equivalent wavelength toward the target object 10.

The second lighting devices 400 may include a second lighting unit 410, a second grid unit 420, a second grid transfer unit 430 and a second condensing lens 440. The elements of second lighting devices 400 are substantially the same as the first lighting devices 300, duplicated explanations is omitted.

The second lighting part 450 irradiates a light toward the target object 10 to capture 2-dimensional image of the target object 10. In one embodiment, the second lighting part 450 may include a red light 452, a green light 454, and a blue light 456. For example, the red light 452, the green light 454 and the blue light 456 may be arranged above the target object in circular to irradiate each of red, green, and blue lights toward the target object 10, or may be arranged with different heights as shown in FIG. 1.

The image obtaining part 500 is connected to the camera 210 of the image capturing part 200 to obtain and store pattern images of the first lighting part. Also, the image obtaining part 500 obtains and stores 2-dimensional images of the second lighting part 450 from the camera 210. For example, the image obtaining part 500 includes an imaging system which receives and stores N-pattern images of the first lighting part and N-pattern images of the second lighting part 450.

The module controlling part 600 is connected to the measurement stage part 100, the image capturing part 200, plurality of first lighting part 300, and plurality of second lighting part 400 and controls them. For example, the module controlling part 600 includes a lighting controller, a grid controller, and a stage controller. The lighting controller controls the first and second lighting units 310 and 410 and releases lights, the grid controller controls the first and second grid transfer units 330 and 430 to move the first and second grid units 320 and 420. The stage controller controls the stage transfer unit 120 to move the stage 110 to up down left right side.

The central processing part 700 is connected to the image obtaining part 500 and the module controlling part 600. In more detail, the central processing part 700 measures 3-dimensional shape of the target object 110 by calculating a height of the target object 110 through receiving the N-pattern images of the first lighting device and N-pattern images of the second lighting device 450 from the imaging system of the image obtaining part 500. Also, the central processing part 700 may control each of the light controller, the grid controller, and the state controller. Thus, the central processing part 700 may include an image processing board, a controlling board, and an interface board.

A method of measuring a height of 3-dimensional measurement shape apparatus according to an embodiment of the present invention is described below.

The method includes irradiating grid pattern lights, which have identical equivalent wavelength or equivalent wavelength different from each other, from plurality of first and second lighting devices 300 and 400 toward the target object 10, capturing images by using a camera 210, and calculating heights of the target object 10 through the central processing part 700 by using pattern images which are formed by the first and second lighting devices 300 and 400 (first to eighth channel or first to eighth lighting device).

Herein, a primary noise may be excluded for pixel unit from 8 pattern images before calculating the heights.

As described above, a representative height of the target object 10 is determined by the central processing part 700 after calculating heights of the target object 10 through the first and second lighting devices 300 and 400.

Herein, in order to determine the representative height, one or in a combination of the following method may be used: 1) calculating an average value of heights which are calculated from all or selected channels, 2) selecting a median value among heights calculated from all or selected channels as the representative height through the central processing part 700, and 3) selecting a height of a channel which has at least one identical height exists among height information measured from all or selected channels.

Herein, the median value means the value which is located in the middle when the calculated heights are arranged in the size order. Alternatively, the median value may be a value which is close to the average height value or a middle value among the heights of the channels. And a secondary noise may be excluded before determining a representative height, and after excluding the secondary noise, a representative height may be determined by using the selected channels. Method of excluding the primary and secondary noises is explained in more detail later.

Meanwhile, a method of measuring a height of 3-dimensional measurement shape apparatus according to an embodiment of the present invention using multi-wavelength is described below.

Figure 3:
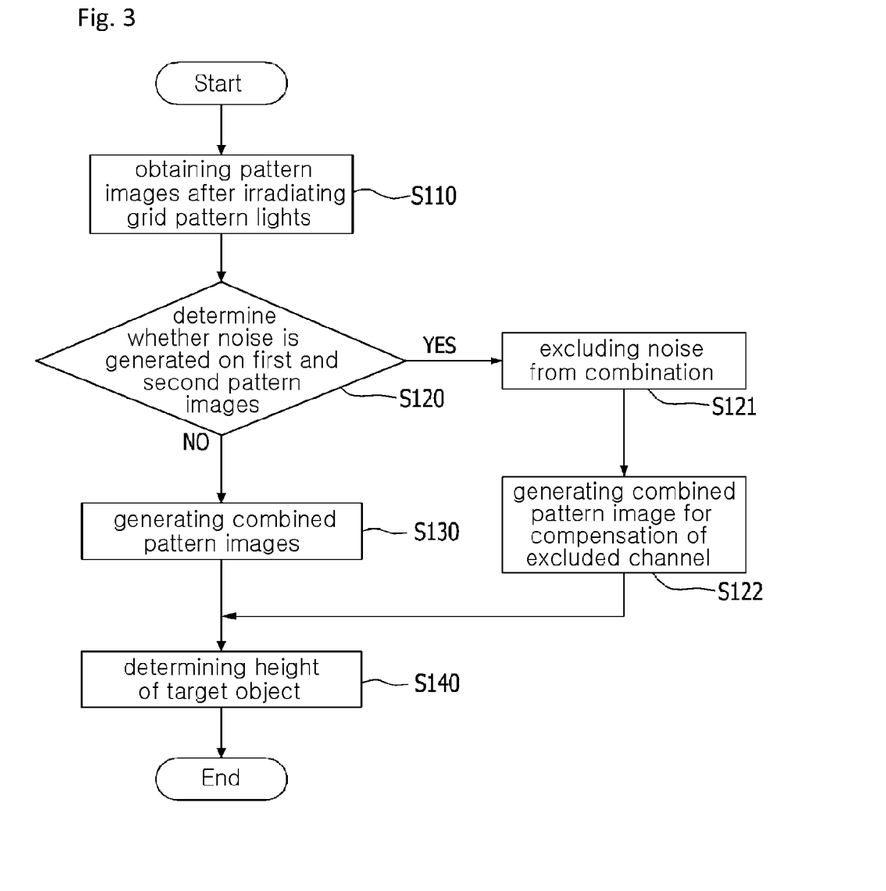
FIG. 3 is a flow chart explaining a method of measuring a height of 3-dimensional shape measurement system according to an embodiment of the present invention.

Referring to FIGS. 1-3, a method of measuring a height of 3-dimensional shape measurement apparatus according to an embodiment of the present invention irradiates grid pattern lights which is emitted from a lighting device and have predetermined equivalent wavelength toward a target object, captures pattern images by using a camera, and measures 3-dimensional shape based on a height of a target object by using the captured pattern.

Referring to FIGS. 1-3, in order to measure a height of a target object using the 3-dimensional shape measurement apparatus, first, first pattern images are obtained by using a camera 210 by irradiating grid pattern lights having a first equivalent wavelength toward a target object 10, the grid lights are emitted from first lighting devices 300, which are arranged at an identical distance with a target object 10 as the center (S110).

Also, second pattern images are obtained by using the camera 210 by irradiating grid pattern lights having a second equivalent wavelength toward the target object 10, the grid lights are emitted from second lighting devices 300, which are arranged alternatively to the first lighting devices (S110).

Herein, the sequence of obtaining the first pattern images by irradiating grid pattern lights having the first equivalent wavelength toward a target object 10 and obtaining the second pattern images by irradiating grid pattern lights having the second equivalent wavelength toward a target object 10 may be changed.

After obtaining the first and second pattern images by sequentially irradiating grid pattern lights with different equivalent wavelengths toward the target object 10 which are emitted from plurality of the first lighting devices 300 and plurality of the second lighting devices 400 arranged alternatively to the first lighting devices 300, plurality of the first and second pattern images, which are obtained from the first and second lighting devices 300 and 400 adjacent to each other, are combined by an image obtaining part 500, and combined pattern images are generated by a central processing part 700 (S130).

In one embodiment, pattern images which are adjacent at both sides may be used to generate the combined pattern images. In other words, the first and second pattern images may be used to combine with pattern images of the first and second lighting devices 300 and 300 and 400 which are adjacent at both sides.

Alternatively, pattern images which are adjacent at any one side may be used to generate the combined pattern images. In other words, the first and second pattern images may be used to combine with pattern images of the first and second lighting devices 300 and 300 and 400 which are adjacent at any one side.

Referring to FIGS. 2 and 3, generating the combined pattern images by using pattern images which are adjacent to each other is described below.

As shown in FIG. 2, first lighting devices 300a 300b 300c and 300d indicated by numbers 1, 3, 5, and 7 are arranged at an identical distance with a target object 10 with the center, and second lighting devices 400a 400b 400c and 400d indicated by numbers 2, 4, 6, and 8 are arranged at an identical distance between the first lighting devices 300a 300b 300c and 300d. Therefore, plurality of first pattern images are obtained by a camera 210 by irradiating grid pattern lights emitted from first lighting devices 300a 300b 300c and 300d, which are indicated by numbers 1, 3, 5, and 7 and have first equivalent wavelength, toward the target object 10, and plurality of second pattern images are obtained by a camera 210 by irradiating grid pattern lights emitted from the second lighting devices 400a 400b 400c and 400d, which are indicated by numbers 2, 4, 6, and 8, and have second equivalent wavelength, toward the target object 10. After, each of combined pattern images is generated by combining the first and the second pattern images which are formed by the first and second lighting devices adjacent to each other, in other words, dotted ellipses (first to eighth channels) which tie the first and second lighting devices adjacent to each other as shown in FIG. 2

Herein, when the first lighting devices 300a 300b 300c and 300d generate an equivalent wavelength having a first wavelength $\lambda_1$ and the second lighting devices 400a 400b 400c and 400d generate an equivalent wavelength having a second wavelength $\lambda_2$, then, the wavelength $\lambda_{12}$ is determined as $\lambda_{12}=\lambda_1\lambda_2/(1-\lambda_2)$, and an available height capable of being measured by the 3-dimensional shaped measurement apparatus using the first and second lighting devices 300 and 400 may correspond to the wavelength $\lambda_{12}$ of a grid pattern light.

Herein, 16 pattern images are generated by combining the first and second pattern images to each other. In one embodiment of the present invention, each of first and second pattern images of the first and second lighting devices which are tied in dotted ellipses are combined to generate each of combined pattern images, in such a case, calculation time is reduced.

A height of a target object 10 is calculated through the central processing part 700 according to a combined equivalent wavelength by using each of combined pattern images after combining each of first and second pattern images of the first and second lighting devices 300 and 400 as described above. For example, as shown in FIG. 2, 8 heights of the target object 10 is calculated through the central processing part 700 by using combined pattern images through the first to eighth channels (S140).

Meanwhile, the generation of the combined pattern images may be performed in duplicate. In other words, after generating a first combined pattern image by first combining first and second pattern images obtained by first and second lighting devices 300 and 400 which are adjacent to each other among the plurality of first and second lighting devices 300 and 400, a second combined pattern image may be generated by second combining first and second combined pattern images. Therefore, heights of the target object 20 may be calculated by the second combined pattern images, and herein, available heights capable of being measured may be increased since heights of the target object 10 is determined according to the combined equivalent wave length.

After calculating heights of the target object 10, a representative height is determined through the central processing part 700 by using the calculated heights of the target object 10. Herein, a height of one pattern image among the calculated heights of the target object 10 may be determined as the representative height. In this case, a reliability of final height measurement is an improved measurement since the representative height is determined from actually measured data.

For example, a median value may be determined as a representative height when the calculated heights of the target object are arranged in an order of size. In other words, a median value among the eight calculated heights values of the target object 10 is determined as a representative height of the target object 10 by the central processing part 700. Herein, a representative height of the target object 10 is not determined from an average height of the eight calculated heights but a median value among the eight calculated heights of the target object 10, because an average value of the target object 10 may be damaged when a noise is included among the first and second pattern images. Therefore, it may be preferable to determine a median value rather than an average value of the eight heights of the target object 10 as a representative height of the target object 10 to get an accurate height of the target object 10.

In addition, before generating combined pattern image by combining first and second pattern images obtained by first and second lighting devices 300 and 400 which are adjacent to each other among the plurality of first and second lighting devices 300 and 400, excluding a primary noise of the first and second pattern images which are formed by the first and second lighting devices 300 and 400 through the central processing part 700 may further be included (S120).

A signal which deviates from a tolerance based on at least one of brightness, signal to noise ratio, and phase-smearing of the first and second pattern images is determined as the primary noise.

And, a secondary noise may be excluded after calculating the eight heights of the target object 10. A height which one exceeds a tolerance among the eight heights of the target object 10 or not included within the same range, or a bouncing height may be determined as the secondary noise. A representative height may be calculated after excluding the noise.

Herein, the determined noise may be excluded from the combination (S121). For example, a pattern image which is determined as the primary noise among the first and second pattern images is excluded and not combined with the adjacent pattern image. For example, when a first pattern image formed by a first lighting device indicated by number 1 is determined as noise, then first and second images of the first channel (first lighting device 300a indicated by number 1 and second lighting device 400a indicated by number 2) and first and second images of the eighth channel (first lighting device 300a indicated by number 1 and second lighting device 400d indicated by number 8) which includes the first pattern image formed by the first lighting device 300a indicated by number 1, are excluded from the combination by the central processing part 700.

Meanwhile, a second pattern image formed by the second lighting device 400a, which is indicated by number 2, and adjacent to the first pattern image determined as noise is not determined as noise and is combined with a first pattern image formed by a first lighting device 300c indicated by number 5 and then, is combined to generate combined pattern image through the central processing part 700 (S122). Also, a second pattern image formed by the second lighting device 400d, which is indicated by number 8, and adjacent to the first pattern image determined as noise, is combined with a first pattern image formed by the first lighting device 300c indicated by number 5, and then, is combined to generate combined pattern image through the central processing part 700. Therefore, the exclusion of the first and eighth channels according to the noise determination of the first pattern image formed by the first lighting device 300a indicated by number 1 may be compensated.

As a result, each height of the target object 10 is calculated through the central processing part 700 by using combined pattern image calculated from the second to seventh channels, which do not include noises, and combined pattern image calculated from the two compensated pattern images.

The primary noise may be determined for pixel of the pattern images, and the determined pixel may be excluded from the combination. Alternatively, the pattern image which includes noise pixel may be entirely excluded from the combination. For example, when the noise pixel occupies predetermined ratio of the entire pattern image, the pattern image is determined not trusted and the pattern image may be excluded from the combination. Next, each height of the target object 10 is calculated, and an average height calculated from the central processing part 700 is determined as a representative height or, a median height among the calculated heights is determined as the representative height of the target object 10.

Meanwhile, the secondary noise may be determined for pixel of the first and second pattern images, and the height according to the determined noise pixel may be excluded when determining the representative height.

As described above, a method of measuring height of 3-dimensional shape measurement according to an embodiment of the present invention irradiates grid pattern lights, which are emitted from plurality of first and second lighting devices 300 and 400 and have different equivalent wavelengths, toward a target object 10, generates combined pattern image after combining first and second pattern images formed by first and second lighting devices 300 and 400 which are adjacent to each other, and calculates a representative height of the target object 10 by using combined equivalent wavelength of the combined pattern images.

Therefore, 3-dimensional shape measurement apparatus according to an embodiment of the present invention may measure a height of a target object 10 which exceeds available height of measurement by first and second lighting devices 300 and 400, and reliable height may be obtained.

Also, it is possible to improve an accuracy and reliability of final height measurement when noise data or height data corresponding to a noise which is measured from a target object is excluded from the combination.

Also, it is possible to improve a reliability of final height measurement since a representative height is determined from actually measured data when the representative height is determined from a height of pattern image among heights calculated from the target object, and the final height measurement may be more reliable if a median value is selected to the representative height of a target object since noise which is not excluded is not effectual.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

The invention claimed is:

1. A method of measuring a height of 3-dimensional shape measurement apparatus comprising:
   irradiating a first grid pattern light from a plurality of first lighting devices and a second grid pattern light from a plurality of second lighting devices which are alternatively arranged to the first lighting devices toward a target object wherein the first grid pattern light has a first equivalent wavelength and the second grid pattern light has a second equivalent wavelength that is different from the first equivalent wavelength, and obtaining a first pattern image corresponding to the first grid pattern light and a second pattern image corresponding to the second grid pattern light;
   generating combined pattern images by combining the first and second pattern images obtained from the first and second lighting devices adjacent to each other among the plurality of first and second lighting devices;
   calculating heights of the target object according to a combined equivalent wavelength of the combined pattern images; and
   determining a representative height of the target object by using the calculated heights of the target object.

2. The method of claim 1, when generating combined pattern images, wherein each of the first and second pattern images is used to be combined with a pattern image of the lighting device which are adjacent at any one side.

3. The method of claim 1, when generating combined pattern images, wherein each of the first and second pattern images is used to be combined with a pattern image of the lighting device which are adjacent at both sides.

4. The method of claim 1, wherein generating the combined pattern images comprises:
   generating first combined pattern images by first combining first and second pattern images formed by the first and second lighting devices which are adjacent to each other among the plurality of first and second lighting devices; and
   generating second combined pattern images by second combining first and second combined pattern images, and
   wherein calculating heights of the target object according to the combined equivalent wavelength of the combines pattern images comprises calculating heights of the target object according to a combined equivalent wavelength of the second combined pattern images.

5. The method of claim 1, before generating the combined pattern images, further comprising:
   determining a primary noise among the first and second pattern images; and
   excluding the determined primary noise from the combination.

6. The method of claim 5, wherein the primary noise is determined when a signal which deviates from a tolerance based on at least one of brightness, signal to noise ratio and phase-smearing of the first and second pattern images is generated.

7. The method of claim 6, wherein the primary noise is determined for each pixel of the first and second pattern images, and
   wherein excluding the determined primary noise comprises at least one of:
   excluding a pixel which is determined as a noise among pixels of the first and second pattern images from the combination; and
   excluding a pattern image which includes a pixel determined as a noise among the first and second pattern images from the combination.

8. The method of claim 5, after excluding the determined noise from the combination, further comprising combining a pattern image which is adjacent at both sides of the pattern image determined as noise with a pattern image which is not adjacent to each other and has a different equivalent wavelength from each other.

9. The method of claim 1, after calculating heights of the target object according to the combined equivalent wavelength of the combined pattern images, further comprising:
   determining a secondary noise among the calculated heights; and
   excluding the determined noise from the representative height determination.

10. The method of claim 9, when determining a secondary noise, wherein a height which deviates from a tolerance among the calculated heights of the target object is determined as a noise.

11. The method of claim 10, wherein the secondary noise is determined for each pixel of the first and second pattern images, and
   excluding the determined noise from the representative height determination comprises excluding a height corresponding to the pixel determined as a noise pixel among the heights of the target object from the representative height determination.

12. The method of claim 1, wherein determining the representative height of the target object by using the calculated heights of the target object comprises determining a median value as the representative height when the calculated heights of the target object are arranged in an order of size.

* * * * *